April 23, 1935. H. LAGARDE 1,998,629
PROCESS OF AND APPARATUS FOR TRANSFERRING LIQUEFIED GASES
Filed April 7, 1932
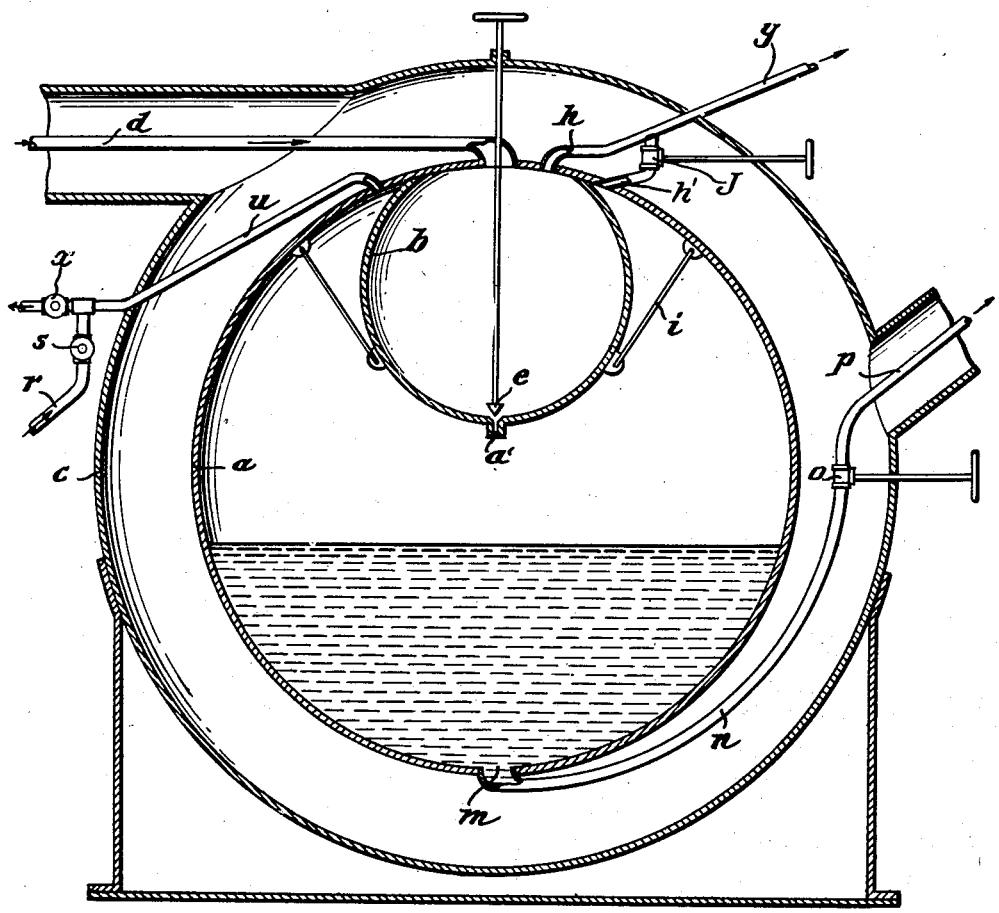
Henri Lagarde Inventor
By
Attorneys Patented Apr. 23, 1935

1,998,629

UNITED STATES PATENT OFFICE 1,998,629

PROCESS OF AND APPARATUS FOR TRANSFERRING LIQUEFIED GASES

Henri Lagarde, La Varenne, France, assignor to l'Air Liquide, Societe Anonyme pour l'Etude & l'Exploitation des Procedes Georges Claude, Paris, France Application April 7, 1932, Serial No. 603,888 In Germany April 8, 1931

11 Claims. (Cl. 62—1)

It is known that in the manufacture of liquefied gases, for example oxygen, in liquefying and rectifying apparatus, it is desirable that the liquefied gas to be further utilized be kept in the apparatus at as low a pressure as is possible.

One of the principal reasons for this is the following: as the liquid contained in the rectifying apparatus is subsequently drawn off from the apparatus, the pressure-drop which results from this drawing off causes the liquid to be partly vaporized. Since this vaporization increases as the drop in pressure increases, it is desirable that the pressure-drop be reduced to the minimum value possible, i. e. to a few hundred grams per sq. cm.

It is also known that in order to store the liquefied gas after its manufacture, it is collected in carefully heat-insulated storage vessels and that, in order to transport the liquefied gas to the consumption place, it is transferred into transportable vessels mounted on lorries, railway-cars, etc. This transfer may be obtained by gravity, by placing the rectifying apparatus and the storage vessel at a certain height above the transportable vessel. But this dispostion of the installation would not prove practical, for it would result in a considerable height of this installation. A special pump for liquefied gases may be also utilized, as previously known, for the purpose of transferring the liquefied gas from one vessel into another vessel. But it is sometimes advantageous to obtain automatically this transfer by means of a gaseous pressure exerted above the liquefied gas in the vessel to be emptied; unfortunately this process can be seldom carried out, when the storage vessel is connected to the rectifying apparatus, as the pressure created above the liquid in the storage vessel practically prevents the liquefied gas from flowing from the rectifying apparatus into the storage vessel. This stopping of the flow of the liquefied gas from the rectifying apparatus would entail an undesirable disturbance in this rectifying apparatus. Therefore two separate storage vessels are resorted to, which alternately receive the liquid and deliver it also alternately. One of the two storage vessels is alternately connected to the rectifying column and collects the liquid coming from this column, while a gaseous pressure is applied in the interior of the other storage vessel, disconnected from the column, in order that the transportable vessel be filled with the liquefied gas from the storage vessel. But this process with alternate operations is relatively expensive as it necessitates practically a double equipment and results in a somewhat great space being taken up.

The present invention has particularly for its object to obviate these drawbacks. According to the invention the liquefied gas is conducted in a first vessel, passes through a valve into a second vessel, and, after this valve is closed, is discharged under pressure out of the second vessel while the first vessel is simultaneously filled under a lower pressure with liquefied gas.

Preferably, the first vessel is adjacent to the second vessel and, for example, is disposed in the interior and at the upper part of this second vessel; the capacity of the first vessel is such as it may collect the liquefied gas produced in the rectifying column during the time the liquefied gas is drawn off from the second vessel and transferred into a transportable vessel. Only one storage vessel is therefore necessary and consequently the space taken up is much reduced and furthermore the operations of transferring the liquefied gas necessitate a minimum of valves to be manipulated.

In the accompanying drawing is diagrammatically illustrated a device for carrying out the present invention.

This device comprises a storage vessel $a$ for liquefied gases, disposed within a mantle $c$ from which it is insulated by a suitable heat-insulating material, such as carbonate of magnesia. A small auxiliary container $b$ is fixed at the top of the vessel $a$ by suitable means, e. g. by chains $i$. This container $b$ can communicate with the vessel $a$ only through the orifice $a'$, that can be closed by the valve $e$, and through the pipes $h$ and $h'$, the latter being provided with a valve $j$. The pipes $h$ and $h'$ terminate in a common conduit $y$, through which the evaporated gas escapes and is for example passed into a gasometer. Through a conduit $u$, provided with a valve $x$, normally closed, the gas may be rapidly drawn off from the vessel $a$. A pipe $r$, valved at $s$, is connected to the conduit $u$ and serves for the admission of gas under pressure into the vessel $a$.

The liquefied gas coming from the rectifying apparatus (not shown), is passed through the pipe $d$; the liquefied gas is discharged from the vessel $a$ through the pipe $n$, $p$, which is connected to a transport vessel (not shown); this pipe may be closed by a valve $o$.

The storage vessel $a$ is of course provided with the usual fittings (pressure gage, safety-valve, etc.)

The working of the apparatus is as follows: during the filling operation of the storage vessel $a$, the valve $e$ and $j$ are open, the valves $o$ $x$ and $s$ are closed. The liquefied gas comes from the rectifying apparatus through $d$; it is discharged into the container $b$, passes through the orifice $a'$ and is collected in the storage vessel $a$. The gas produced by the vaporization of the liquefied gas escapes out of the vessel through the pipe $h'$ and the open valve $j$.

When it is desired to draw off the liquefied gas from the storage vessel $a$ and to fill a transport vessel, this transport vessel is connected to the pipe $p$, and the valves $e$ and $j$ are closed. By the pipe $r$ and the open valve $s$ a gas under pressure is admitted into the vessel $a$, thus creating the gaseous pressure necessary to the transfer of the liquefied gas from the storage vessel $a$. The valve $o$ is then opened and the transport vessel is filled. During the time of this filling operation, the liquefied gas coming from the rectifying apparatus flows into the container $b$, where it is stored and the evaporated gas escapes from this container through pipes $h$ and $y$.

When the filling of the transport vessel is completed, the valve $o$ is closed and the gas under pressure contained in the vessel $a$ is discharged through the pipe $u$ and the open valve $x$, the valve $s$ being closed. The valves $e$ and $j$ are thereafter opened; thus the liquefied gas contained in $b$ will flow into the vessel $a$ through the orifice $a'$ and the vessel $a$ acts again as a storage vessel for storing the liquefied gas coming from the rectifying apparatus.

The liquefied gas can be transferred from the storage vessel into the transport vessel by utilizing simultaneously a gaseous pressure above the liquid in the storage vessel and a pump which forces the liquefied gas from the storage vessel into the transport vessel.

It is quite obvious that the vessels $a$ and $b$ may present other forms than the form illustrated in the drawing by way of an example and may be constructed so as to be suitable for the different cases to be encountered. For example, the container $b$ may be placed above the vessel $a$ and in the interior of the heat-insulating material which surrounds $a$, instead of being situated in the interior of the vessel $a$, as illustrated in the drawing.

What I claim is:

1. An apparatus for filling and drawing off liquefied gases which comprises a storage vessel, an intermediate vessel disposed in the interior of said storage vessel, an opening at the lowest part of said intermediate vessel, means for closing said opening, a filling conduit for admitting liquefied gas into the intermediate vessel, a discharge conduit for drawing off the liquefied gas from the storage vessel, and means for admitting gas under pressure into said storage vessel.

2. An apparatus as claimed in claim 1, in which the intermediate vessel is disposed at the top of the storage vessel.

3. An apparatus as in claim 1 in which the upper part of the intermediate vessel is constituted by the upper part of the storage vessel.

4. An apparatus for filling and drawing off liquefied gases which comprises a storage vessel, an intermediate vessel disposed in the interior of said storage vessel, an opening at the lowest part of said intermediate vessel, means for closing said opening, a filling conduit for admitting liquefied gas into the intermediate vessel, a conduit for the escape from the intermediate vessel of the gases produced in this vessel by vaporization of liquefied gas, a discharge conduit for drawing off the liquefied gas from the storage vessel, and means for admitting gas under pressure into said storage vessel.

5. An apparatus for filling and drawing off liquefied gases which comprises a storage vessel, an intermediate vessel disposed in the interior of said storage vessel, an opening at the lowest part of said intermediate vessel, means for closing said opening, a filling conduit for admitting liquefied gas into the intermediate vessel, a discharge conduit for drawing off the liquefied gas from the storage vessel, means for admitting gas under pressure into said storage vessel, a conduit for the escape from the intermediate vessel of the gases produced in this vessel by vaporization of liquefied gas, and a second valved conduit for the escape from the storage vessel of the gases produced in this vessel by vaporization of the liquefied gas.

6. An apparatus for filling and drawing off liquefied gases which comprises a storage vessel, an intermediate vessel disposed in the interior of said storage vessel, an opening at the lowest part of said intermediate vessel, means for closing said opening, a filling conduit for admitting liquefied gas into the intermediate vessel, a discharge conduit for drawing off the liquefied gas from the storage vessel, means for admitting gas under pressure into said storage vessel, a conduit for the escape from the intermediate vessel of the gases produced in this vessel by vaporization of liquefied gas and a second valved conduit for conducting into the first conduit the gases produced in the storage vessel by vaporization of liquefied gas.

7. An apparatus for filling and drawing off liquefied gases which comprises a storage vessel, an intermediate vessel disposed in the interior of said storage vessel, an opening at the lowest part of said intermediate vessel, means for closing said opening, a filling conduit for admitting liquefied gas into the intermediate vessel, a discharge conduit for drawing off the liquefied gas from the storage vessel, and means for admitting gas under pressure into said storage vessel, the capacity of the intermediate vessel being large enough to collect and store the liquefied gas discharged into said vessel during the period of drawing off under pressure the liquefied gas from the storage vessel.

8. A process for simultaneously discharging a liquefied gas from a gas liquefying plant and drawing off the liquefied discharged gas which comprises, collecting the liquefied gas produced by the liquefying plant in a first collecting confined space, drawing off the thus collected liquefied gas to a second collecting confined space, suppressing said drawing off between the two collecting confined spaces and drawing off liquefied gas from the second collecting confined space by means of a gaseous pressure while simultaneously collecting in the first collecting confined space under a lower pressure than the above gaseous pressure the liquefied gas produced by the liquefying plant.

9. A process for simultaneously discharging a liquefied gas from a gas liquefying plant and drawing off the liquefied discharged gas which comprises, discharging the liquefied gas produced by the liquefying plant through a first collecting confined space into a second collecting confined space, stopping said discharge, and drawing off liquefied gas from the second collecting confined space by means of a gaseous pressure while simultaneously collecting in the first collecting confined space under a lower pressure than the above gaseous pressure the liquefied gas produced by the liquefying plant.

10. A process for simultaneously discharging a liquefied gas from a gas liquefying plant and drawing off the liquefied discharged gas which comprises, collecting the liquefied gas produced by the liquefying plant in a first collecting confined space, drawing off the thus collected liquefied gas to a second collecting confined space, suppressing said drawing off between the two collecting confined spaces, drawing off liquefied gas from the second collecting confined space by means of a gaseous pressure while simultaneously collecting in the first collecting confined space under a lower pressure than the above gaseous pressure the liquefied gas produced by the liquefying plant, releasing the pressure in the second collecting confined space and drawing off the liquefied gas collected in the first collecting confined space to the second collecting space.

11. A process for simultaneously discharging a liquefied gas from a gas liquefying plant and drawing off the liquefied discharged gas which comprises, collecting the liquefied gas produced by the liquefying plant in a first collecting confined space, allowing the gases evaporated in said collecting confined space to escape out of said space, drawing off the thus collected liquefied gas to a second collecting confined space, allowing the gases evaporated in said second collecting confined space to escape out of said confined space, suppressing said drawing off between the two collecting confined spaces, suppressing the escaping of the gases evaporated in the second collecting confined space and drawing off liquefied gas from the second collecting confined space by means of a gaseous pressure while simultaneously collecting in the first collecting confined space under a lower pressure than the above gaseous pressure the liquefied gas produced by the liquefying plant.

HENRI LAGARDE.